United States Patent [19]
Matsuda et al.

[11] 4,397,550
[45] Aug. 9, 1983

[54] LASER DOPPLER VELOCIMETER

[75] Inventors: Kiyofumi Matsuda; Tomoaki Eiju, both of Ibaragi, Japan

[73] Assignees: Agency of Industrial Science & Technology; Ministry of International Trade & Industry, both of Tokyo, Japan

[21] Appl. No.: 236,053

[22] Filed: Feb. 19, 1981

[30] Foreign Application Priority Data

Feb. 21, 1980 [JP] Japan .................. 55-21166
Nov. 15, 1980 [JP] Japan .................. 55-16095

[51] Int. Cl.$^3$ ............................. G01P 3/36
[52] U.S. Cl. .................. 356/28.5; 332/7.51; 356/349
[58] Field of Search ............... 356/28.5, 346, 349; 332/7.51

[56] References Cited

U.S. PATENT DOCUMENTS

| | | | |
|---|---|---|---|
| 3,560,874 | 2/1971 | Duguay | 332/7.51 |
| 3,649,125 | 3/1972 | Lehmann | 356/28.5 |
| 3,825,348 | 7/1974 | Nomarski et al. | 356/349 |
| 4,176,950 | 12/1979 | Franke | 332/7.51 |
| 4,278,351 | 7/1981 | Frosch et al. | 356/346 |

OTHER PUBLICATIONS

Balasubramanian et al., Photogrammetric Eng. and Remote Sensing, vol. 42, No. 12, 12-1976, pp. 1529; 356-349.
Matsuda et al., Applied Optics, vol. 20, No. 22, Nov. 15, 1981.
Priezzhev et al., Moscow Univ. Phys. Bulletin, vol. 34, No. 6, 1979.

Primary Examiner—S. C. Buczinski
Attorney, Agent, or Firm—Oblon, Fisher, Spivak, McClelland & Maier

[57] ABSTRACT

A laser Doppler velocimeter using two laser beams, when used for the measurement of the flow velocity of slow moving particles, fails to provide the measurement because the Doppler frequency and the pedestal component overlap on the power spectrum. This difficulty is eliminated by having a prism disposed in the path of one of the laser beams used. When this prism is continuously moved, the pedestal component and the Doppler frequency are separated from each other on the power spectrum, enabling the velocimeter to effect the measurement easily and accurately.

7 Claims, 13 Drawing Figures

Fig_5
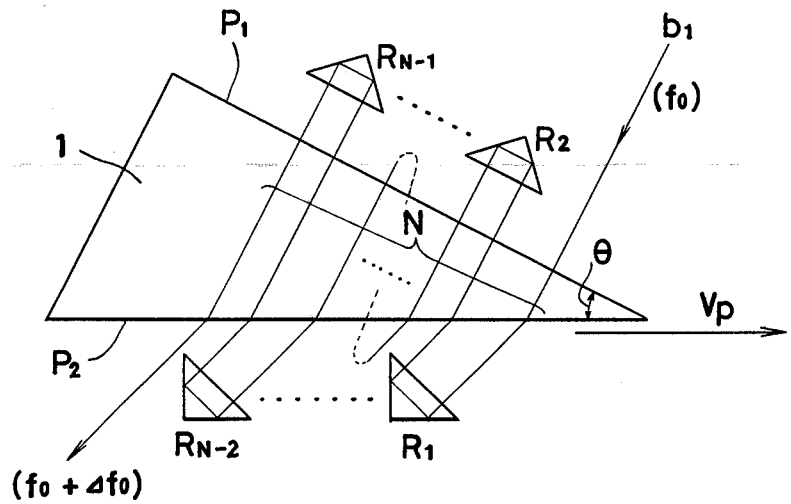
Fig_7
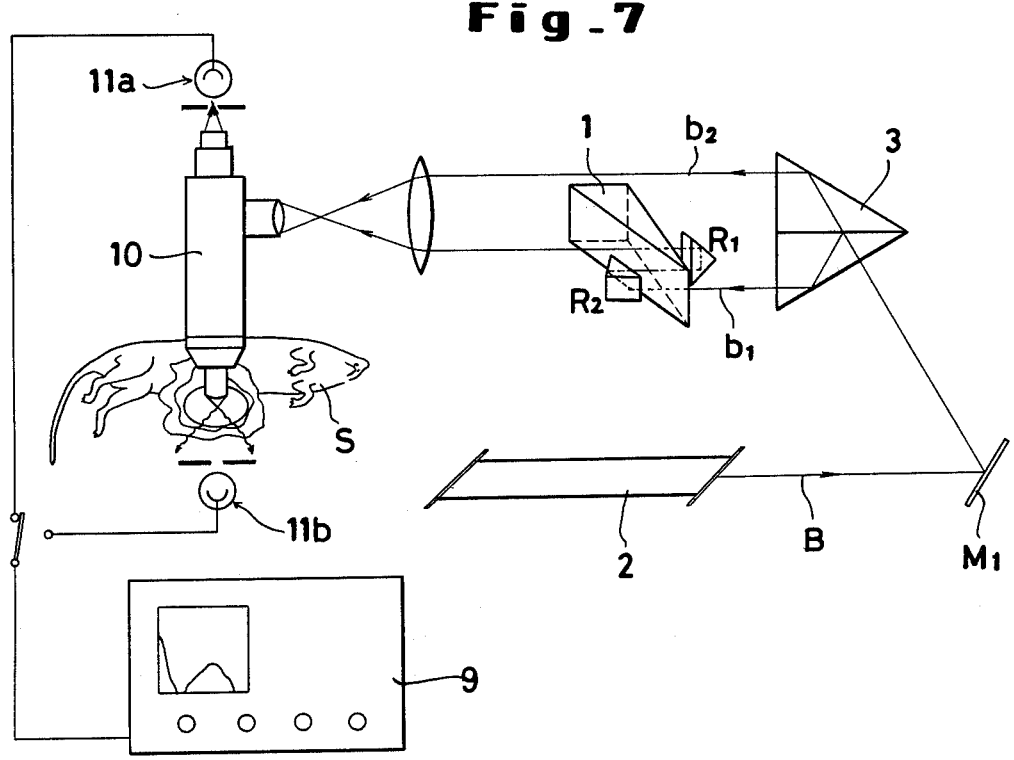

LASER DOPPLER VELOCIMETER

BACKGROUND OF THE INVENTION

This invention relates to a laser Doppler velocimeter for the measurement of the flow of a liquid such as blood or of a gas or powder.

Measurement of the velocity of blood flow has now become a potential diagonostic method for detecting diseased portions in the circulatory system represented by vascular stenosis and vascular thrombosis or for investigating vital reactions occurring in consequence of administration of treatments and medicines. The apparatuses heretofore known in the art to render this measurement feasible mainly include electromagnetic flowmeters, ultrasonic Doppler velocimeters and laser Doppler velocimeters (hereinafter called "LDV"). Because of a common advantage that they provide quick measurement, require no incursion, cause no pain to the subject, and so on, such apparatuses are finding increasing acceptance in clinical use. While all the conventional apparatuses are effective in the measurement or blood flows at relatively high speeds, they exhibit inferior resolving power in measuring blood flows at low speeds. In extreme cases, they are totally incapable of providing required measurement.

Among these conventional apparatuses, the LDV is held to be particularly suitable for medical applications because the frequency of the laser beam for producing the Doppler beat frequency is relatively high and proportionally easy to detect and, moreover, because the laser beam can be constricted to a diameter small enough for the beam to be accurately focused on specific fine spots such as in the capillaries.

The LDV provides measurement of the velocity of a given blood flow by directing the laser beam onto the blood vessel and detecting the time-course change in the intensity (Doppler beats) of the forwardscattered portion of the beam, the change in intensity being generated in consequence of the Doppler shift caused by the motion of the red blood cells. Several methods have been proposed to date for performing this measurement. One proposal has been made by P. Buchhave, "Laser Doppler Velocimeter with Variable Optical Frequency Shift" (Optics and Laser Technology, Feb. 1975, pp. 11–16). This particular method involves beating a variable, local-oscillated frequency with the Doppler shifted signal to determine the shift frequency. By this method, which is essentially heterodyne system, it is possible to detect a high shifted frequency in the range of from 10 KHz to 50 MHz. Moving particles producing a shifted frequency within this range have a relatively high flow velocity and this method permits effective measurement of the velocity of flow of particles which are flowing at such a high speed. It is, however, incapable of measuring the velocity of moving particles passing through an extremely small region and producing a lower shifted frequency. This is because, during the power spectrum analysis of the beat frequency of the scattered light, the pedestal component is invariably in the extremely low frequency band overlapping the low Doppler beat frequency produced as a result of the slow motion of the particles so that the two frequencies cannot be discriminated from each other.

To overcome this difficulty, H. Mishina et al have proposed in "A Laser Doppler Microscope" (Optics and Laser Tech., June 1976, pp 121–127) a method for eliminating the pedestal component affecting the desired beat signal by means of an optical system using light polarization or a method resorting to an expensive electronic tracking filter. As indicated in the report, however, the former method using the light polarization necessitates a complicated optical system and the latter method using the electron tracking filter has a disadvantage that successful tracking becomes difficult unless beat signals are detected continuously whereas beat signals of a low frequency are in fact obtained in bursts in the measurement of moving particles passing through an extremely small region. The two methods, accordingly, have not been practicable.

The present inventors previously proposed a method for effectively eliminating the pedestal component as an extraneous component as reported in a Japanese Journal titled "Ōyō Butsuri, Vol. 48, No. 2, pp. 175(83)-178(86)." Because the pedestal component corresponds to the sum of the outputs which would be derived from the photosensor by separately applying two beams to a given specimen, this method selectively extracts the Doppler frequency by deducting the aforesaid sum of the outputs from the output derived by simultaneous use of the two beams. This method, therefore, requires three kinds of data obtained by separate use and simultaneous use of the two beams upon the specimen. It has the disadvantage that it entails time-consuming work for data collection.

Other literature dealing with the LDV includes Japanese Patent Publications No. 63634/1980 and No. 75668/1980. Another article dealing with the LDV has been written by J. Oldengarm under the title "Development of Rotating Diffraction Gratings and Their Use in Laser Anemometry" (Optics and Laser Tech., Apr. 1977, pp. 69–71). This concerns adoption of a diffraction grating as a combination beam splitter and frequency shifter.

As described above, when the beat frequency resulting from the Doppler shift is manifested on the power spectrum, the pedestal component which varies with the distance over which the particles move through the zone irradiated by the laser beam is inevitably within an extremely low frequency band. No practical and reliable technique has been developed for providing effective elimination of the pedestal component from the desired beat signal. In the measurement of a low velocity of liquid flow, when the beat frequency approaches or overlaps with the pedestal component band, it becomes difficult or even impossible to discriminate the two frequencies from each other.

The conventional methods for the measurement of blood flow, even including the LDV capable of highly efficient measurement, have proved unsuitable for the measurement of low velocities of blood flow as described above. In these circumstances, strong need has been felt for improvements in the LDV as a medical apparatus useful in investigating various disorders of the circulatory system.

SUMMARY OF THE INVENTION

An object of this invention is to provide a laser Doppler velocimeter, which permits easy separation of the Doppler beat frequency and the pedestal component which occur in a mixed state in a low frequency band of the power spectral distribution involved during the measurement of a slow blood flow and, accordingly, provides accurate, quick determination of the direction velocity of the blood flow even when the velocity is low.

To accomplish the object described above, the laser Doppler velocimeter of the present invention comprises a light source for generating a pair of coherent beams directed toward a given test specimen and means for detecting the light scattered by the test specimen simultaneously exposed to the two beams, which velocimeter is characterized by interposing at least one means capable of continuously modulating the beam frequency in the path of one of the beams propagated between the light source and the test specimen.

While the pedestal component is not affected by the frequency of the beams directed onto the specimen or by the Doppler shift, the beat frequency of the scattered light from the test specimen can be varied on the power spectrum over a fixed duration of time by subjecting one of the irradiation beams to continuous frequency modulation. This fact implies that the Doppler beat frequency necessary for the measurement can be separated from the pedestal component. Based on the signal thus obtained, the flow velocity and direction of blood flow in a given sample can be determined by the conventional method. As the means for modulating the frequency of one of the beams, there may be used one or more prisms such as wedged glasses. The required modulation of the beam frequency is accomplished by disposing the prism in the path of the beam and then causing the prism to be moved so as to change the length of the beam's path through the prism.

The other objects and characteristics of the present invention will become apparent from the further disclosure of the invention to be made hereinbelow with reference to the accompanying drawing.

BRIEF EXPLANATION OF THE DRAWING

FIG. 5 is an explanatory diagram of the third embodiment of the present invention.

FIG. 7 is a schematic explanatory diagram of an experiment performed with the seventh embodiment of the invention.

DESCRIPTION OF THE PREFERRED EMBODIMENT

Figure 1:
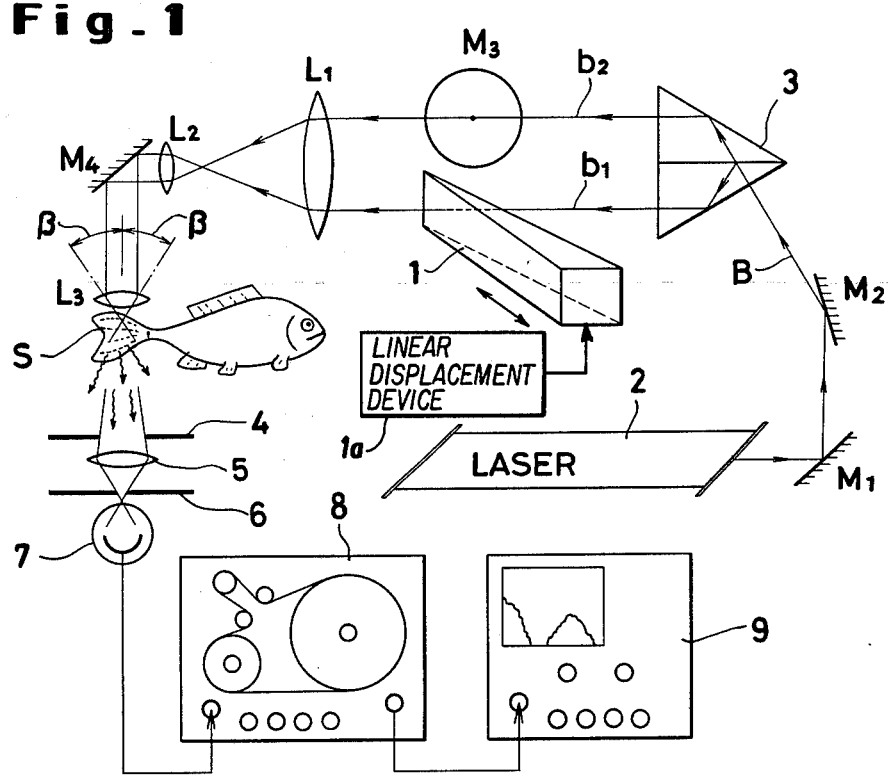
FIG. 1 is a schematic explanatory diagram of the first embodiment of the laser Doppler velocimeter according to the present invention.

The first embodiment of the laser Doppler velocimeter provided by the present invention will be described with reference to the schematic diagram of FIG. 1. The laser Doppler velocimeter of the present embodiment assumes a conventional structure known as the two-beam differential type, which chiefly comprises a light source 2 (such as a He-Ne laser) for producing a coherent beam B, a beam splitter 3 serving to split the coherent beam B from the light source 2 into two beams $b_1$, $b_2$, an optical system using lenses $L_1$, $L_2$ and $L_3$ for focusing the beams $b_1$, $b_2$ on one point at a suitable position on a specimen S, means for detecting the forwardscattered light of the specimen S and a device for processing the detected signal. The detection means and the processing device used herein are of the well-known type. For example, the detection means comprises an aperture 4, a condenser 5, a pinhole 6 and a photomultiplier 7, and the processing device comprising a data recorder 8 for recording of the output from the photomultiplier 7 and a spectrum analyzer 9 for obtaining a power spectrum by performing Fourier conversion on the detected signal over a fixed length of time. In the present embodiment, the data recorder 8 is not an essential requirement for the analysis of power spectrum. Since the processing operation in the spectrum analyzer 9 can be carried out substantially on the real-time basis, the entire operation can be performed quickly. The reflecting mirrors $M_1$, $M_2$ and $M_4$ are indicated purely for the convenience of illustration. Similarly to the lenses $L_2$, $L_3$ in the optical system, these reflecting mirrors may be omitted in the actual use of this embodiment. One salient feature of the present invention resides in the disposition of a prism such as a wedged glass 1 in the path of one of the beams between the beam splitter 3 and the lens $L_1$ for effecting modulation of the beam frequency achieved by movement of the prism 1 by means of a conventional linear displacement device schematically indicated by reference numeral designation 1a in FIG. 1. Owing to this special arrangement, the apparatus of the present invention enables measurement with high resolving power even at a low flow speed. The principle of the measurement of blood flow with a laser Doppler velocimeter not provided with the prism will be described by way of background explanation.

Here, a goldfish is used as the specimen S for the test. The velocimeter is assumed to be used for measuring the blood flow in a blood capillary in the caudal fin of the goldfish. By means of the aforementioned optical system, the beams $b_1$, $b_2$ are caused to impinge at different angles upon a single point of the specimen S (with an interference fringe formed consequently at the point) and then pass through the specimen to produce a forwardscattered light. Since the two beams impinge at different angles upon one point, the particles (blood cells) flowing in one fixed direction cause Doppler shifts of different magnitudes in the beams. Consequently, the beat frequency of the light scattered by these particles depends on these magnitudes of the Doppler shifts. The velocity of the blood flow, therefore, can be measured by determining the beat frequency of the scattered light in an arbitray plane in the space behind the specimen S. This determination is generally accomplished by measuring, with the photomultiplier 7, the amount of the scattered light passing through a given area (the aperture 4) of that plane. Based on the output of the photomultiplier 7, the Doppler frequency is analyzed to determine the velocity of the blood flow. More specifically, this Doppler frequency is obtained by indicating, in terms of power spectrum, the amplitude of the signals issued from the photomultiplier 7 for a fixed length of time. In the power spectrum thus obtained, however, the waveform of the pedestal component invariably appears in the low-frequency band below 200 Hz. Where the blood flow under test involves a flow velocity of not more than 1 mm/sec, the waveform of the Doppler frequency $D_f$ having a certan band width partially or wholly overlaps the waveform of the pedestal component P as illustrated by way of example in FIG. 2(a), making it impossible to discriminate between the pedestal component and the Doppler frequency. In other words, the conventional method of laser Doppler velocimetry has failed to provide effective measurement of the blood flow at low flow speeds.

Figure 2A:
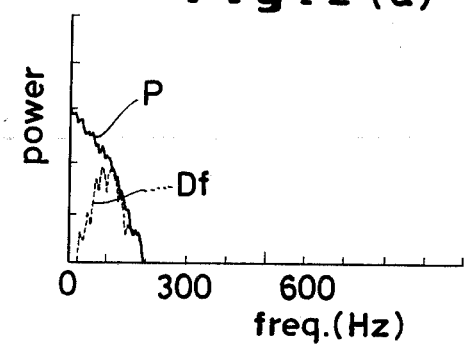
FIGS. 2(a), 2(b) and 2(c) are diagrams of power spectra obtained by the first embodiment of the velocimeter of the present invention.
Figure 2B:
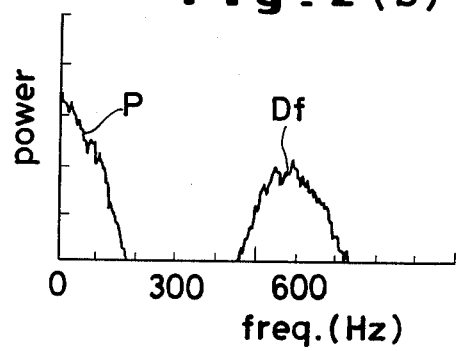
Figure 2C:
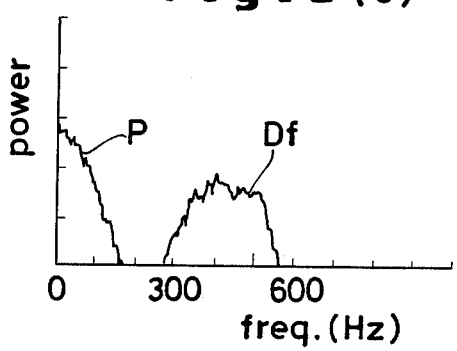

The present invention has originated in the attention paid to the nature of the pedestal component, namely that this component is not affected as by the frequency of the beams used but varies with the time required for the passage of the blood cells (particles under test) through the irradiation zone (the zone irradiated by the laser beams) and the frequency band of the component expands from the zero point to high levels when the zone of irradiation is decreased in area. On the other hand, the Doppler frequency which carries the information about the velocity of blood flow is such that its center frequency can be shifted on the power spectrum not merely by the Doppler effect but also by varying the frequency of the irradiating beams, particularly by the difference between the frequencies of the two luminous beams. In short, in this invention a prism such as a wedged glass capable of modulating the frequency is disposed in the path of one of the irradiating beams, whereby the pedestal component P and the Doppler frequency $D_f$ appearing in the power spectrum produced by means of the prism can be separated and discriminated from each other as illustrated in FIG. 2(b) or 2(c) by moving the prism along the path of the beam.

Figure 3:
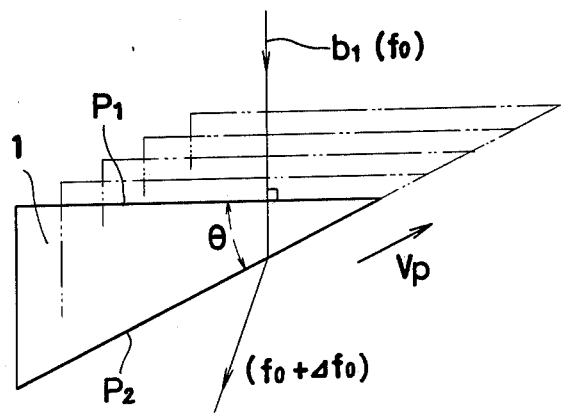
FIG. 3 is an explanatory diagram of the effect of a prism as a principal component for the apparatus of this invention.
Figure 4:
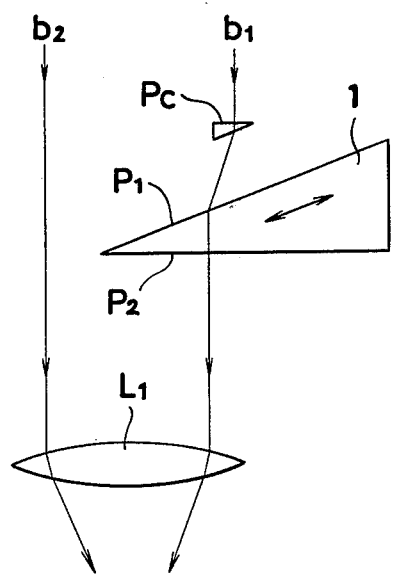
FIG. 4 is an explanatory diagram of the second embodiment of the present invention.

The prism 1 used in the apparatus of this invention may be in any form insofar as the incident plane $P_1$ and the refractive plane $P_2$ thereof form a prescribed angle $\theta$ as illustrated in FIG. 3. When this prism is to be incorporated in the optical system of the apparatus, it must be designed so that the laser beam $b_1$ impinges perpendicularly on the incident plane $P_1$ and the prism is movable parallelly to the refractive plane $P_2$. This design is imperative for the purpose of keeping the axis of the beam passing through the prism unaffected by the movement of the prism. To avoid possible loss of parallelism between the beam $b_1$ and the other beam $b_2$ due to the incorporation of the prism in the path of the beam $b_1$, a mirror $M_3$ is disposed in the path of the beam $b_2$ as illustrated in FIG. 1. Optionally, a light path correcting prism $P_c$ may be disposed before or after the prism 1 in the path of the beam $b_1$ as illustrated in FIG. 4. In this case, the two prisms are required to possess identical refractive angles and to be laid so that the incident beams perpendicularly impinge upon their respective incident planes. The device in the illustrated embodiment is not the only means available for the correction of refraction in the prism 1, various other devices being conceivable for this purpose.

When one of the two beams $b_1$, $b_2$ which have the same frequency and phase ($b_1$ in the illustrated embodiment) is passed through the prism, the optical path of the beam $b_1$ is in effect made greater than that of the beam $b_2$. Consequently, there ensues a phase difference between the two beams. With this arrangement, this phase difference varies continuously if the prism is moved so as to continuously increase (or decrease) the length of the beam's path through the prism. The movement of the prism, therefore, produces a difference of frequency between the two beams. Assume that a prism having a refractive index of n is moved laterally at a velocity of $V_p$, and the frequency difference (modulation amount) $\Delta f_0$ between the two beams and the increase velocity $V_d$ of the thickness of prism will be correlated with each other as shown by the following formula.

$$\Delta f_0 = \frac{V_d(1 - n)}{\lambda} \tag{1}$$

$$V_d = V_p \cdot \sin \theta \tag{2}$$

In the formulas, $\lambda$ stands for the wavelength of the beam and $\theta$ for the angle (apex) formed between the incident plane and the refractive angle of the prism.

The frequency of the beam $b_1$ which has propagated via the prism equals the sum of the aforementioned frequency difference, $\Delta f_0$, and the frequency, $f_0$, of the beam $b_2$ which has propagated via air. The relation which exists at this time between the frequency, f, of the scattered light which has undergone the Doppler shifting, and the velocity, V, of blood flow is indicated as follows:

$$f = \left| \frac{2 \cdot \sin\beta \cdot f_0 \cdot V}{c} - \Delta f_0 \right| \tag{3}$$

In the formula, $\beta$ stands for the angle of incidence of the beam on the sample and c for the speed of light. As is evident from this formula, the term "$2 \cdot \sin \beta \cdot f_0 \cdot V/c$" represents the frequency of the scattered light which exists when the beams impinging upon the specimen have the same frequency, indicating that, by subtracting the frequency, $\Delta f_0$, resulting from modulation by the prism movement, the Doppler frequency can be separated on the power spectrum from the pedestal component.

It is plain from the foregoing description that since the frequency, $\Delta f_0$, corresponds to the amount of the frequency shift caused by the prism movement, the modulation must be increased so much as to permit easy discrimination where the particles under test are flowing at a relatively high speed. To satisfy this requirement, it would suffices to increase at least one or all of the apex angle $\theta$, the refractive index and the velocity of movement of the prism. By the reason of reflection loss, however, it is undesirable to increase the apex angle or the refractive index. Because of the limited size of the apparatus, the velocity of the prism movement cannot be increased so much. As a solution, one or more reflecting means R are disposed along the axis of the beam $b_1$ before and after the prism 1 relative to the direction of the beam propagation as illustrated in FIG. 5, so that they reflect the beam $b_1$ repeatedly and cause it to pass through the prism 1 N-times in all. The amount of modulation obtained in this arrangement is found in accordance with the following equation which is derived from Formula (1).

$$f_0 = N \frac{V_d(1 - n)}{\lambda} \tag{4}$$

As a result, the measurement of the velocity of flow can be performed with high accuracy not only on particles flowing at a low speed but also on particles flowing at a high speed. The velocimeter, therefore, provides accurate measurement over a wide range of flow velocity.

Figure 6A:
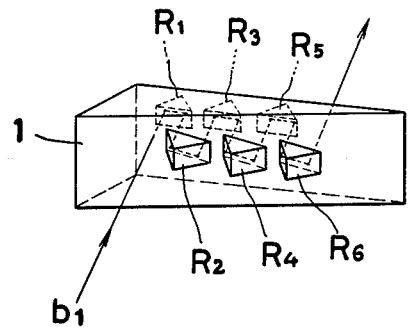
FIGS. 6(a), 6(b) and 6(c) are diagrams of the fourth, fifth and sixth embodiments, which are modifications of the third embodiment in FIG. 5.
Figure 6B:
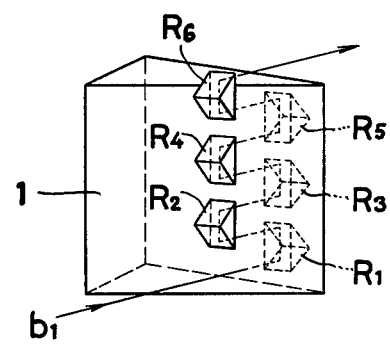
Figure 6C:
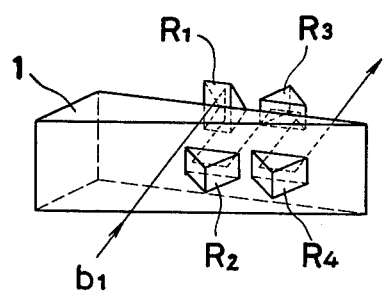

FIGS. 6(a) through 6(b) illustrate typical modifications of the embodiment of FIG. 5, each provided with a plurality of reflecting means $R_1, R_2, \ldots R_6$ before and after the prism 1. In the arrangements of FIGS. 6(a) and 6(b), the beam undergoes modulation seven times. In the arrangement of FIG. 6(c) the beam $b_1$ from the light source is directly caused to impinge upon the first reflecting means $R_1$ and undergo modulation four times. In the present embodiment, since the first reflecting mirror $R_1$ is provided behind the prism in such a position that the incident beam may be reflected in parallel to the axis of the incident beam, there is no use any longer for the path correction means ($M_3$ in FIG. 1 or $P_c$ in FIG. 4).

Figure 8:
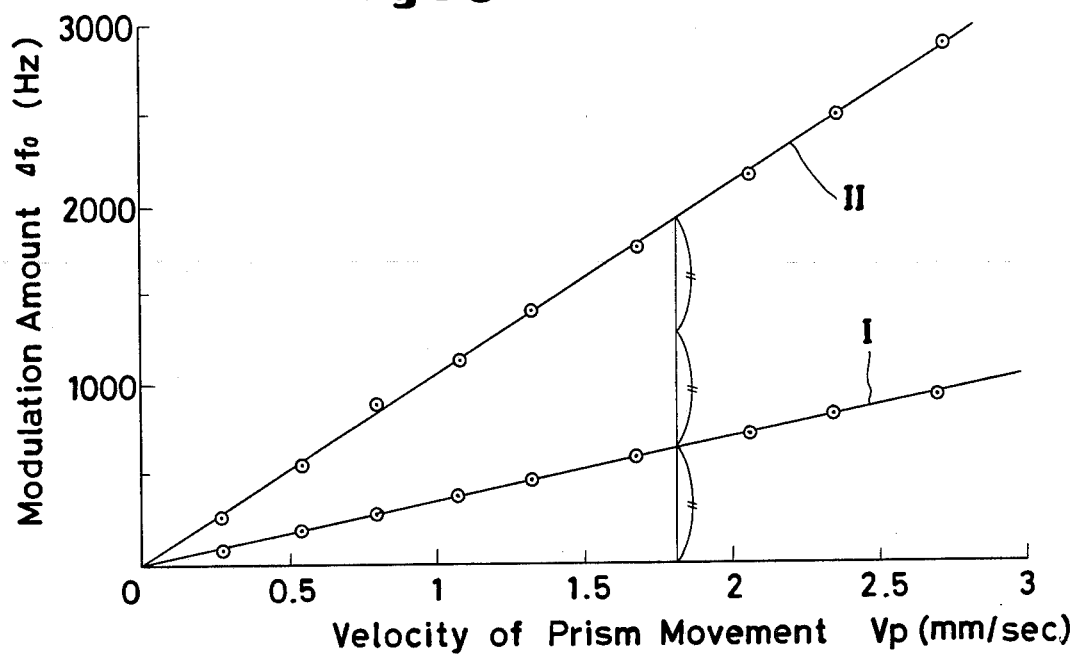
FIG. 8 is a graph showing the results of the experiment performed as illustrated in FIG. 7.

An experiment in which the modulation system of the arrangement of FIG. 6(c) is used for the measurement of blood flow of a relatively low speed in one capillary vessel in the internal organs of a living specimen S such as of a rat is depicted in outline in FIG. 7. Here, a reflecting microscope 10 is used as the means for focusing the beams $b_1, b_2$ upon the capillary vessel under test. Either the photosensor 11a at the eyepiece portion is used for detecting the Doppler beat in the reflected light or the photosensor 11b on the objective lens side is used for detecting the Doppler beat in the forwardscattered light, whichever is convenient. Then, the Doppler beat is subjected to power spectrum analysis on the spectral analyzer 9, to determine the velocity of blood flow. The other mechanical elements involves in this embodiment are identical to those involved in the embodiment of FIG. 1. FIG. 8 shows a characteristic curve I of the amount of modulation, $\Delta f$, obtained by passing the beam just once through the prism and a characteristic curve II of the amount of modulation obtained by passing the beam three times through the prism, with the curves derived from the results of an actual experiment. At any point of the velocity $V_p$ of the prism movement, the value of the characteristic curve II is found to be three times that of the characteristic curve I, indicating that the amount of modulation can be increased proportionally by increasing the number of passages of the beam through the prism. This property proves advantageous for measurement performed on blood flow of a relatively high speed. In the graph, the solid lines represent the theoretical values and the plotted points represent the actually measured values. They suggest substantial agreement between the found values and the calculated values.

Now, a typical experiment in which the embodiment of FIG. 1 depicting the basic construction of this invention was used for the measurement of blood flow in a capillary in the caudal fin of a goldfish will be described specifically below.

In the apparatus constructed as shown in FIG. 1, a He-Ne laser (output, 2 mW; wavelength, 633 nm) and a prism made of BK7 and having a refractive index of 1.52, an apex angle ($\theta$) of 26°, a refracting plane length of about 111 mm, a height of 30 mm and a distance of about 85 mm available for movement were used. A movement of this prism at a rate of about 1.42 mm/sec produces a frequency shift ($\Delta f_0$) of 512 Hz on the power spectrum. FIG. 2(a) represents the power spectrum of the scattered light obtained when the prism was kept motionless so that the beam impinging upon the specimen had the same frequency. In the power spectrum, the Doppler frequency, $D_f$, was completely overlapped by the pedestal component P and, therefore, could not be discriminated. FIG. 2(b) represents the frequency shift obtained in one of the two beams by moving the prism so that the interference fringe due to the two beams might change its position opposite the direction of blood flow. FIG. 2(c) represents the frequency shift obtained similarly, except the position of the interference fringe was changed in the same direction as the blood flow. In either of the cases just mentioned, the Doppler frequency, $D_f$, was separated from the pedestal component P. The velocity of blood flow could be calculated from this Doppler frequency. On the power spectrum of FIG. 2(b) the shifted frequency was shown to be 595 Hz relative to the center frequency. By applying this value to the equation of formula (3), the Doppler frequency was found to be 83 Hz. In the case of FIG. 2(c) the shifted frequency was found to be 425 Hz and the Doppler frequency to be 87 Hz. By averaging these values, therefore, the velocity of blood flow could be calculated to be 0.136 mm/sec. Visual observation aided by a microscope confirmed that the blood flow took about 3 seconds to travel a distance of 400 $\mu$m (about 0.133 mm/sec of flow velocity). The found value and the calculated value were in good agreement.

The velocity of blood flow can be determined as described above. In the meantime, the direction of blood flow can be determined based on the amount of shift of the Doppler frequency and the direction of the frequency shift on the power spectrum. These calculations can be easily performed by the known methods. Since the present invention provides clear discrimination between the Doppler frequency and the pedestal component, it is fully capable of determining the direction of blood flow even when the blood flows at a low speed.

Figure 9:
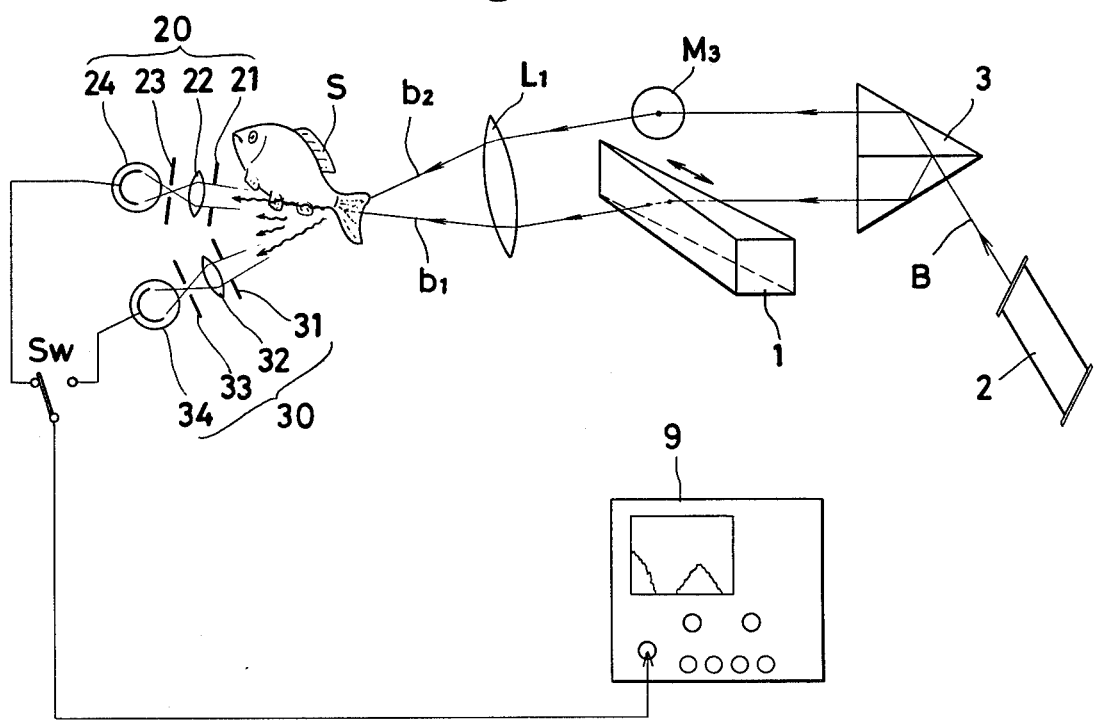
FIG. 9 is a schematic explanatory diagram of an experiment performed with the eighth embodiment of the invention.

The embodiment described above represents a typical differential method utilizing the interference of the scattered light. The apparatus illustrated in FIG. 9 is designed to be operated by the reference light method. With this apparatus, the Doppler frequency can be obtained similarly to the aforementioned differential method by using the scattered light produced by the beam which has undergone frequency shift by the prism and, as reference light, the directly transmitted light of the beam which has not undergone any frequency shift (because of aerial propagation). In the construction of FIG. 9, the component elements denoted by like symbols are equivalent to those of like symbols in FIG. 1 and the optical system up to the specimen S is also equivalent. A pair of photosensors 20, 30 are disposed on the extensions of the axes of the two beams to receive the scattered lights produced behind the specimen by the two beams and detect the interference beats between the frequency-shifted lights and the direct lights (reference lights). These photosensors respectively comprise apertures 21, 31, condensers 22, 32, pinholes 23, 33 and photomultipliers 24, 34. The outputs of the two photomultipliers are switched by one switch Sw, so as to produce a desired output selectively. The outputs from the two photomultipliers are respectively forwarded to the spectrum analyzer 9, there to undergo Fourier transform and permit calculation of power spectrum. Thereafter, the rate of blood flow can be calculated by the method of the aforementioned embodiment.

As is clear from the foregoing description, the present invention provides a laser Doppler velocimeter which is capable of easily and safely separating the pedestal component and the signal component even in the range of flow of low speed and permitting detection of the direction of flow by a quick operation. This apparatus is operable by the two-beam differential method and the reference light method described above. Optionally, it may be operated for detecting the Doppler frequency based solely on the forwardscattered light as well as for detecting the backscatteredlight as by the conventional method. Thus, the present invention can be easily applied to all existing laser Doppler velocimeters. It can be utilized not merely for medical applications involving the measurement of blood flow but also for the determination of flow velocities of liquids, gases, powders, etc. involved in industrial operations.

We claim:

1. A laser Doppler velocimeter adapted to determine the velocity of flow of particles in motion by causing two coherent beams to impinge upon one point of the path of said particles thereby producing scattered light and a consequent interference beat, detecting in said interference beat the Doppler frequency due to the Doppler shift caused by the particles in motion and calculating the velocity of motion of the particles based on the Doppler frequency, which velocimeter is provided in the path of one of said two beams with at least one prism having an incident plane arranged perpendicular to the path of the incident beam and a refractive plane being at angles with the incident plane, said prism being adapted to be moved in a direction parallel to the refractive plane for producing continuous change in the length of the beam path therethrough, thereby to modulate the frequency of the beam.

2. The laser Doppler velocimeter according to claims 1, wherein one or more reflecting means are disposed on the axis of the beam before and after the modulation means relative to the direction of the beam propagation so as to cause the beam to pass through said modulation means a plurality of times.

3. The laser Doppler velocimeter according to claims 1, wherein a mirror capable of correcting a beam path is provided in the path of the beam which is not subject to the frequency shifting by said modulation means.

4. The laser Doppler velocimeter according to claim 1, wherein a second prism capable of correcting a beam path is provided in the path of the beam which is subject to the frequency shifting by the passage through said modulation means.

5. The laser Doppler velocimeter according to claim 2, wherein the first of said plurality of reflecting means is disposed behind the prism and the incident beam is caused to impinge directly upon this means and is reflected thereby in a direction parallel to the axis of the incident beam.

6. The laser Doppler velocimeter according to claim 1, wherein the Doppler frequency is obtained by detecting the interference beat of the scattered light produced by causing the two beams, one of which is subjected to frequency modulation by means of the prism, to impinge upon the particles in motion.

7. The laser Doppler velocimeter according to claim 1, wherein the Doppler frequency is obtained by detecting the interference beat between the scattered light produced by one of the beams which is subjected to frequency modulation by means of the prism and transmitted light produced by causing the other beam to impinge upon the particles in motion.

* * * * *